United States Patent
Nagano et al.

[11] Patent Number: 5,899,812
[45] Date of Patent: May 4, 1999

[54] DAMPER MECHANISM HAVING A FRICTION GENERATING MECHANISM

[75] Inventors: Tamio Nagano; Yoshitaka Kubota; Yasushi Takehira; Yoshiyuki Shindoh, all of Neyagawa, Japan

[73] Assignee: Exedy Corporation, Neyagawa, Japan

[21] Appl. No.: 08/938,560

[22] Filed: Sep. 26, 1997

[30] Foreign Application Priority Data

Sep. 27, 1996 [JP] Japan .................................. 8-256344

[51] Int. Cl.⁶ .................................................. F16F 15/12
[52] U.S. Cl. .................. 464/68; 192/213.21; 192/213.22
[58] Field of Search ........................ 464/68; 192/213.11, 192/213.12, 213.2, 213.21, 213.22, 213.3, 213.31, 214, 214.1

[56] References Cited

U.S. PATENT DOCUMENTS

| | | | |
|---|---|---|---|
| 4,549,641 | 10/1985 | Ootani et al. ......................... | 192/214.1 |
| 4,614,261 | 9/1986 | Takeuchi ............................ | 192/213.21 |
| 4,650,053 | 3/1987 | Kayanoki et al. ................. | 192/213.21 |
| 4,908,004 | 3/1990 | Graton et al. ............................. | 464/68 |
| 5,014,842 | 5/1991 | Graton et al. ............................. | 464/68 |
| 5,117,959 | 6/1992 | Graton ..................................... | 464/68 |
| 5,634,543 | 6/1997 | Hashimoto et al. ............... | 192/213.21 |

*Primary Examiner*—Eileen Dunn Lillis
*Attorney, Agent, or Firm*—Shinjyu An Intellectual Property Firm

[57] ABSTRACT

A clutch disc assembly (1) includes a hub (2), a separate flange (5), a retaining plate (3), a clutch plate (4), a first bushing (16), a second bushing (18) and a third bushing (20). The first bushing (16) is disposed between the hub (2) and the retaining plate (3) and slidably moves against them. The second bushing (18) has a friction coefficient different from that of the first bushing (16). The second bushing (18) is disposed between the separate flange (5) and the retaining plate (3) and slidably moves against them. The friction coefficient of a portion facing to the hub (2) of the third bushing (20) is substantially identical with that of the first bushing (16), while the friction coefficient of a portion facing to the separate flange (5) of the third bushing (20) is identical with that of the second bushing (18). The third bushing (20) is disposed between the hub (2), the separate flange (5), and the clutch plate 4, and slidably moves against them.

3 Claims, 2 Drawing Sheets

DAMPER MECHANISM HAVING A FRICTION GENERATING MECHANISM

BACKGROUND OF THE INVENTION

1. Field of the Invention

The present invention relates to a damper mechanism, particularly to a damper mechanism having two levels of torsion vibration dampening characteristics.

2. Description of the Related Art

A clutch disc assembly for use in, for example, an automotive vehicle is typically provided with a power input plate, a power output hub having a flange integral with its outer circumference, and coil springs for elastically coupling the power input plate and the flange in the circumferential direction.

Alternatively, a separate hub/intermediate plate type damper disc assembly have also been provided. In this type of damper disc assembly, the flange portion is made separate from hub defining an intermediate member. Typically, small coil springs elastically couple the hub portion and the separate flange. In this type of clutch disc assembly, a larger twist angular displacement can be produced, and further, two levels of the characteristics of torsion, low rigidity and high rigidity, can be obtained.

In order to produce hysteresis torque (torque produced due to frictional resistance and dampening vibration), a small hysteresis torque generating mechanism is disposed between the power input plate and the hub, and a large hysteresis torque generating mechanism is disposed between the separated flange and the power input plate.

In such a separate hub/intermediate plate type damper disc assembly, the transmission of torsional vibration causes the regular relative rotation between the power input plate, the separated flange and the power output hub. At this time, the coil springs are compressed, thereby producing hysteresis torque in the small hysteresis torque generating mechanism and the large hysteresis torque generating mechanism.

As to the characteristics of torsion, during a small torsional displacement, the power input plate rotates together with the separate flange. This causes the power output hub to rotate relative to the power input plate and the separate flange. In this case, small coil springs are compressed, thereby producing small hysteresis torque in the small hysteresis torque generating mechanism. When the torsional displacement becomes larger, the separated flange rotates together with the power output hub. This causes the power input plate to rotate relative to the hub and the separate flange. In this case, large coil springs are compressed between the power input plate and the separated flange, thereby producing large hysteresis torque in the large hysteresis torque generating mechanism.

In the separate hub/intermediate plate type damper disc assembly described above, the power input plate is composed of a clutch plate and a retaining plate which are fixed to each other and disposed so as to clamp the separated flange and the power output hub. The small and large hysteresis torque generating mechanisms are composed of bushings (friction members) which are disposed between the plates, the power output hub and the separated flange and slidably move against the power output hub and the separated flange, and conical springs (biasing members) for biasing the bushings toward the power output hub and the separated flange.

The conventional small and large hysteresis generating mechanisms include first bushings having higher friction coefficient disposed on the retaining plate side of the separated flange, second bushings having lower friction coefficient disposed on the retaining plate side of the power output hub, and third bushings having higher friction coefficient disposed on the clutch plate side of the separated flange and the power output hub. In other words, the third bushings are configured to slidably move against both the separated flange and the power output hub. For this reason, small hysteresis torque is produced by sliding movement between the second bushing of lower friction coefficient and the face on the retaining plate side of the power output hub, and sliding movement between the third bushing of higher friction coefficient and the face on the clutch plate side of the power output hub. In this case, since the friction coefficient of the second bushing is different from that of the third bushing, the states of frictional sliding movement in the opposite sides of the power output hub are different and the value of the hysteresis torque is not stable. This degrades the performance of the damper disc assembly.

It may be possible to divide the third bushing into two components, that is, the bushings corresponding the first and second bushings and dispose them to the clutch plate side of the separated flange and the clutch plate side of the power out put hub, respectively. However, it is not desirable because it causes increase in number of components and operational inefficiencies.

SUMMARY OF THE INVENTION

An object of the present invention is to stabilize hysteresis torque without increase in number of components and operational inefficiencies.

In one aspect of the present invention, a damper mechanism for transmitting a torque from a power input rotary body to a power output rotary body while dampening the vibration transmitted from the power input rotary body to the power output rotary body includes a power output member coupled to the power output rotary body. An intermediate member is disposed radially outward from the power output member. A first elastic member elastically couples the power output member and the intermediate member allowing limited relative rotary displacement therebetween. First and second plate members are disposed on opposite axial sides of the power output member and the intermediate member, the first and second members are fixed to each other with the power output member and the intermediate member disposed therebetween. At least one of the first and second plate members are couplable to the power input rotary body. A second elastic member for elastically couples the intermediate member and the first and second plate members in the rotational direction thus allowing for limited relative rotary displacement between the intermediate member and the first and second plate members. The second elastic member has a rigidity different from the rigidity of the first elastic member. A first friction member is disposed between the power output member and the first plate member. The first friction member slidably moves against the power output member to produce hysteresis torque. A second friction member is disposed between the intermediate member and the first plate member. The second friction member is slidably movable against the intermediate member to produce hysteresis torque, the second friction member having a friction coefficient different form the friction coefficient of the first friction member. A third friction member is disposed between the power output member, the intermediate member and the second plate member. The third friction member is fixed to the second plate member for rotation therewith. A first portion of the third friction member is slidably engaged with the power output member, the first portion having a friction coefficient substantially the same as the friction coefficient of the first friction member. A second portion of the third friction member is slidably engaged with the intermediate member and the second portion has a friction coefficient substantially the same as the friction coefficient of the second friction member.

Preferably, the third friction member is integrally formed of at least two different materials such that the first portion is made of a first of the two different materials and the second portion is made of a second of the two different materials.

Preferably, the damper mechanism includes a first biasing member for biasing the first friction member toward the power output member. The first biasing member is disposed between the first plate member and the first friction member. A second biasing member, for biasing the second friction member toward the intermediate member, is disposed between the first plate member and the second friction member. The modulus of elasticity of the first elastic member is lower than the modulus of elasticity of the second elastic member. The friction coefficient of the first elastic member is lower than the friction coefficient of the second elastic member. The first friction member is non-rotatably engaged with the first member and slidably moves against the power output member to produce a first hysteresis torque. The second friction member is non-rotatably engaged with the first plate member and slidably moves against the intermediate member to produce a second hysteresis torque larger than the first hysteresis torque. The first portion of the third friction member is non-rotatably engaged with the second plate member and slidably moves against the power output member to produce a small hysteresis torque substantially identical with the first hysteresis torque. The second portion of the third friction member slidably moves against the intermediate member to produce a large hysteresis torque substantially identical with the second hysteresis torque.

When a rotational torque including torsional vibration is inputted from the power input rotary body to this damper mechanism, the torque is transmitted from the first and second plates to the intermediate member through the second elastic member, further to the output member through the first elastic member, and outputted to the power output rotary body. During this process, the torsional vibration is attenuated by the compression of both elastic members and the sliding movement of each of the friction members.

When the angular displacement of the torsional vibration is within a predetermined range (a first range), the first and second members rotate together with the So intermediate member. This causes the power output member to rotate relative to them. At this time, the first elastic member repeats compression. Also, a frictional resistance is generated due to the sliding movement between the first friction member and the power output member or the first member, and the sliding movement between the portion facing to the power output member of the third friction member and the power output member or the second member. The torque due to the frictional resistance (also referred to as a hysteresis torque) offsets part of the torque due to the vibration. Thus, the torsional vibration is attenuated.

When the angular displacement of the torsional vibration is in a range different from that described above (a second range), the intermediate member rotates together with the power output member to cause the first and second member to rotate relative to them. At this time, the second elastic member repeats compression. Also, a frictional resistance is generated due to the sliding movement between the second friction member and the intermediate member or the first member, and the sliding movement between the portion facing to the intermediate member of the third friction member and the intermediate member or the second member. The torque due to the frictional resistance offsets the torque due to the vibration. Thus, the torsional vibration is attenuated.

In this case, the friction coefficient of the two friction members (the first and third members, or the second and the third members) which simultaneously slide against the power output member, the intermediate member, and the first and second members (hereinafter referred to as slid members) are substantially equal in both of the first and second ranges. When the slid members substantially have the same friction coefficient like this, the sliding performance of each of the friction members is the same as that of the slid members.

In a conventional structure, the friction coefficient of the third friction member is the same in any portion. Therefore, when friction members having different friction coefficient slidably moves at the same time against the slid members, the stability of the hysteresis torque is degraded. However, the third friction member here is formed with two portions, each portion having different friction coefficient, thereby stabilizing the hysteresis torque without increase in number of components and operational inefficiencies.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS FIRST EMBODIMENT

Figure 1:
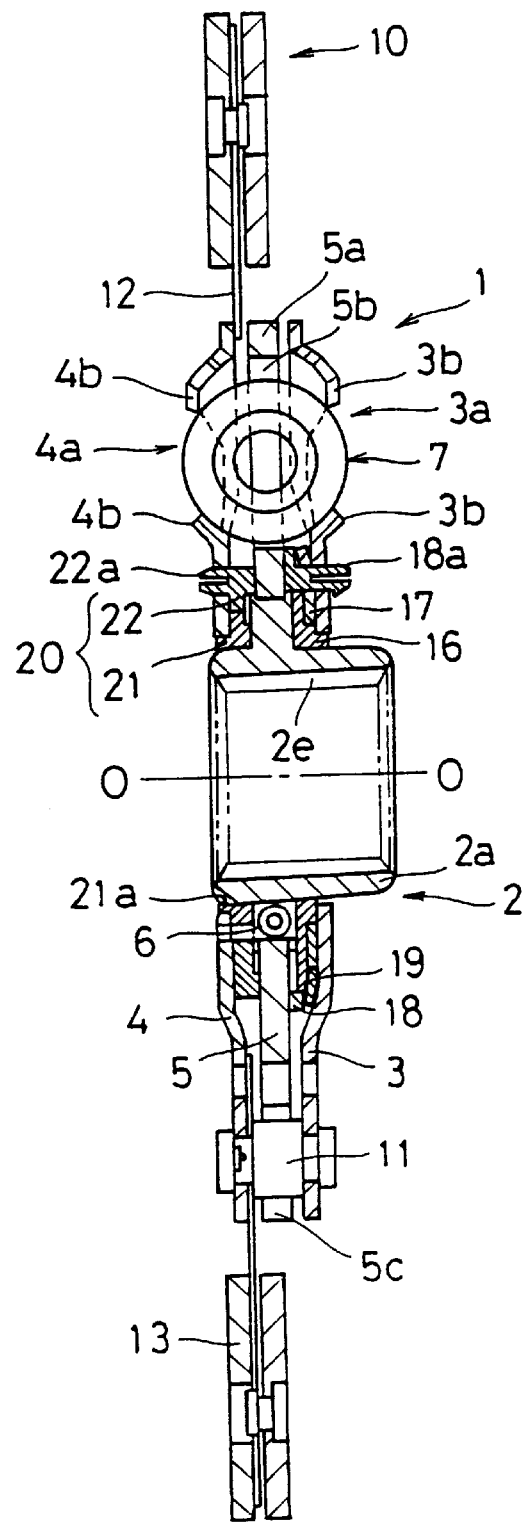
FIG. 1 is a side cross-sectional view showing a clutch disc assembly employing one embodiment of the present invention and FIG. 2 is an exploded elevation, showing a hub portion of the clutch disc assembly depicted in FIG. 1 along with friction generating elements.

A clutch disc assembly 1 employing one embodiment of the present invention is shown in FIG. 1. The clutch disc assembly 1 is used to transmit/interrupt a torque from an engine (not shown) located on the left side of FIG. 1 to a transmission (not shown) located on the right side of FIG. 1. In FIG. 1, line O—O designates a rotary axis of the clutch disc assembly 1. The left side of FIG. 1 will hereinafter be referred to as the engine side and the right side of FIG. 1 will be referred to as the transmission side.

The clutch disc assembly 1 is mainly composed of a hub 2 (a power output element), a separate flange 5 (an intermediate element), a retaining plate 3 (a first member) and a clutch plate 4 (a second plate). Small coil springs 6 (first elastic members) extend in a circumferential direction relative to the clutch disc assembly 1 and are positioned between portions of the separate flange 5 and the hub 2 so as to limit the relative displacement therebetween. Large coil springs 7 (second elastic members) extend in the circumferential direction relative to the clutch disc assembly 1, and are disposed between the plates 3 and 4 and the separate flange 5 so as to limit the relative displacement therebetween.

The plates 3 and 4 and the hub 2 together with a first bushing 16, a first conical spring 17 and a third bushing 20 (described below) constitute a small hysteresis torque generating mechanism for producing a first predetermined amount of friction upon the relative rotation between the plates 3 and 4 and the hub 2. Likewise, the plates 3 and 4 and the separate flange 5 together with a second bushing 18, a second conical spring 19 and the third bushing 20 described below constitute a large hysteresis torque generating mechanism for producing a second predetermined amount of friction upon the relative rotation between the plates 3 and 4 and the separate flange 5.

The hub 2 which is connectable to a shaft (not shown) of the transmission is disposed at the center of the clutch disc assembly 1. The hub 2 includes a cylindrical boss 2a which axially extends and a flange 2b integral with the outer circumference of the boss 2a. Cutaways (not shown) for receiving the circumferentially opposing ends of the small conical springs 6 are formed at two diametrically opposite positions in the flange 2b. A spline hole 2e which is spline-engaged with the shaft (not shown) of the transmission is formed in a center of the boss 2a.

The separate flange 5 is disposed about the outer circumference of the flange 2b of the hub 2 for limited relative rotation. The separate flange 5 is an annular plate. The separate flange 5 includes four extending portions 5a which extend radially outwardly. Each of the extending portions 5a is provided with a circumferentially extending window hole 5b. Outside cutaways 5c are provided between each of the extending portions 5a. The inner circumference of the separate flange 5 is engaged with the flange 2b of the hub 2 so as to rotate relative to the hub 2 by a predetermined angle in the circumferential direction. Further, the inner circumference of the separate flange 5 at two positions corresponding to the cutaways (not shown) of the hub 2 are provided with inside cutaways (not shown). The small coil springs 6 are disposed within the space defined by the cutaways (not shown). Details of the cutaways and window holes are shown, for instance, in commonly assigned co-pending U.S. patent application Ser. No. 08/681,426, filed Jul. 3, 1996, which is incorporated herein by reference in its entirety.

The retaining plate 3 and the clutch plate 4 are disposed on the opposite sides of the separate flange 5. The plates 3 and 4 are a pair of substantially disc-like members having center holes, and rotatably fitted on the outer peripheral side of the boss 2a of the hub 2. The plates 3 and 4 are fixed to each other at their outer peripheral portions by stop pins 11. Each pin 11 extends through the outside cutaway 5c formed in the separate flange 5. A predetermined space is kept in the circumferential direction between the stop pins 11 and the outside cutaways 5c, so that the plates 3, 4 and the separate flange 5 are rotatable relative to each other within a predetermined angle range.

The retaining plate 3 and the clutch plate 4 are provided with window holes 3a and 4a at the positions corresponding to the window holes 5b of the separate flange 5, respectively. The large coil springs 7 are disposed within the space defined by the window holes 5b, 3a and 4a. The circumferentially opposing ends of the large coil springs 7 are in contact with the circumferentially opposing ends of the window holes 5b, 3a and 4a. Holding portions 3b and 4b raised axially outwardly are disposed at the radially opposing sides of each of the window holes 3a and 4a to limit the radial outward movement and the axial movement of the large coil spring 7.

A frictional coupling portion 10 is disposed on the radial outer side of the clutch plate 4. The frictional coupling portion 10 is mainly composed of an annular cushioning plate 12 and friction facings 13. The cushioning plate 12 is fixed to the clutch plate 4 by the stop pins 11. The friction facings 13 are fixed to both sides of the cushioning plate 12. A flywheel (not shown) on the engine side is disposed on the left side in FIG. 1 of the friction facings 13.

Figure 2:
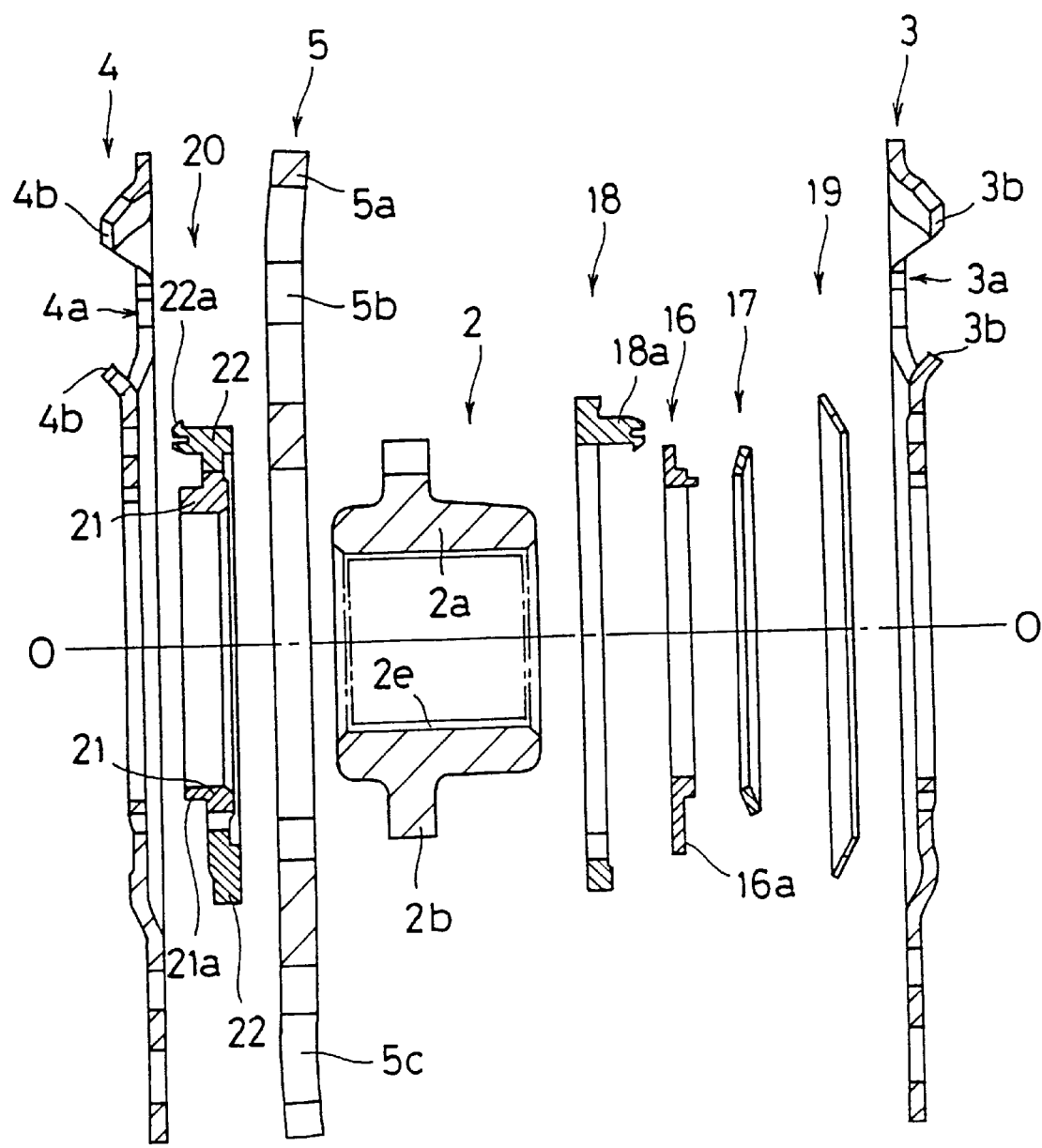

The components constituting the small and large hysteresis torque generating mechanisms are shown in FIG. 2 and are described below.

The main components of the small hysteresis torque generating mechanism include the first bushing (first friction member) 16 disposed between the flange 2b of the hub 2 and the inner circumferential portion of the retaining plate 3, the first conical spring 17 (first biasing member) and an inner circumferential portion 21 of a third bushing 20. The outer circumferential portion of the first bushing 16 is formed with a plurality of extending portions 16a which project radially outwardly. The extending portions 16a are engaged with an inner circumferential portion of a second bushing 18 (described below) so as not to rotate relative thereto, but the second bushing 18 and the first bushing 16 are movable relative to each other in the axial direction. The first conical spring 17 is disposed in a compressed state between the first bushing 16 and the inner circumferential portion of the retaining plate 3. Thus, the first conical spring 17 biases the first bushing 16 toward the flange 2b of the hub 2, and also biases the retaining plate 3 toward the transmission side. The inner circumferential portion of third bushing 21 will be described below.

The main components of the large hysteresis torque generating mechanism are the second bushing (second friction member) 18 disposed between the inner circumferential portion of the separate flange 5 and the retaining plate 3, a second conical spring (second biasing member) 19 and an outer circumferential portion 22 of the third bushing 20. The second bushing 18 is made of a material having a friction coefficient higher than that of the first bushing 16. The second bushing 18 is in contact with the inner circumferential side face of the separate flange 5. The second conical spring 19 is disposed in a compressed state between the second bushing 18 and the retaining plate 3. Thus, the second conical spring 19 biases the second bushing 18 toward the separate flange 5, and also biases the retaining plate 3 toward the transmission side. The second bushing 18 is engaged with the retaining plate 3 so as not to rotate relative to it by a plurality of projecting portions 18a. The projecting portions 18a extend through corresponding apertures formed in the retaining plate 3. The third bushing 20 is described below.

The third bushing 20 is disposed between the inner circumferential portion of the clutch plate 4 and the inner circumferential portions of the flange 2b of the hub 2 and the separate flange 5 in the axial direction. The third bushing 20 is integrally formed with the inner circumferential portion 21 and the outer circumferential portion 22. The inner circumferential portion 21 is made of the same material (or the material having the same friction coefficient) as that of the first bushing 16, and the outer circumferential portion 22 is made of the same material (or the material having the same friction coefficient) as that of the second bushing 18. The inner circumferential portion 21 and the outer circumferential portion 22 are therefore made of different materials. The inner circumferential portion 21 and the outer circumferential portion 22 are molded together to form a single unit or member, but are made of different materials.

The inner circumferential portion 21 is in contact with the side face of the flange 2b of the hub 2 at its side face on the transmission side. The outer circumferential portion 22 is in contact with the side face of the inner circumferential portion of the separate flange 5 at its side face on the transmission side. The inner circumferential portion 21 is provided with an annular extending portion 21a which extends toward the engine in the axial direction. The annular extending portion 21a is engaged with the inner circumferential end of the clutch plate 4 so as not to rotate relative to it. The outer circumferential portion 22 is provided with a snap projection 22a which extends toward the engine in the axial direction. The snap projections 22a are engaged with a hole formed in the clutch plate 4.

The operation of the clutch disc assembly 1 will now be described.

When the friction facing 13 comes into pressing contact with the flywheel (not shown) on the engine side, the torque from flywheel on the engine side is transmitted to the clutch plate 4 and the retaining plate 3. This torque is transmitted to the hub 2 through the large coil springs 7, the separate flange 5 and the small springs 6 and is further outputted to the shaft (not shown) on the transmission side.

Transmitting the twist vibration with smaller angular displacement from the flywheel (not shown) on the engine side to the clutch disc assembly 1 brings about the relative rotation between the plates 3 and 4, the separate flange 5 and the hub 2. At this time, the small springs 6 are compressed in the circumferential direction, the first bushing 16 slidably moves against the side face on the retaining plate 3 side of the flange 2b of the hub 2, and the inner circumferential portion 21 of the third bushing 20 slidably moves against the side face on the clutch plate 4 side of the flange 2b of the hub 2. In this case, since the rigidity of the small coil spring 6 is low and the friction coefficients of the first bushing 16 and the inner circumferential portion 21 are small, small hysteresis torque is produced. The twist vibration with small angular displacement is effectively attenuated due to the characteristics of the low-rigidity and the small friction.

When the twist vibration with larger angular displacement is transmitted to the clutch disc assembly 1, the separate flange 5 rotates together with the hub 2 because of compression engagement with the small spring 6 therebetween. This causes the plates 3 and 4 to rotate relative to the hub 2 and the separate flange 5. At this time, the large coil springs 7 are compressed, the second bushing 18 slidably moves against the side face on the retaining plate 3 side of the separate flange 5, and the outer circumferential portion 22 of the third bushing 20 slidably moves against the side face on the clutch plate side of the separate flange 5. In this case, the biasing force of the second conical spring 19 is larger than that of the first conical spring 17, and further, the friction coefficients of the second bushing 18 and the outer circumferential portion 22 are set larger than that of the respective first bushing 16 and the inner circumferential portion 21, so that large hysteresis torque is produced. The twist vibration with large angular displacement is effectively attenuated due to the characteristics of the high-rigidity and the high friction.

In a conventional structure, the third bushing is made of the same material as the second bushing, and the friction coefficient of the portion of the third bushing where it slidably moves against the flange 2b of the hub 2. For this reason, when producing small hysteresis torque, one side of the flange 2b is slid with the first bushing of lower friction coefficient while the other side of the flange 2b is slid with the third bushing of higher friction coefficient. Therefore, the frictional resistance produced is unstable, thereby degrading the stability of the hysteresis torque. With the configuration of the clutch disc assembly 1 in accordance with this embodiment, the friction coefficients of the buses which may slidably move against the same member are identical, so that the hysteresis torque produced is stable and the vibration dampening ability of the clutch disc assembly 1 is improved.

ADVANTAGES OF THE INVENTION

In the damper mechanism in accordance with the present invention, the third friction member is formed with two separate portions 21 and 22 each having a different friction coefficient, thereby stabilizing the hysteresis torque produced without increase in number of components and operational inefficiencies.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A damper mechanism for transmitting a torque from a power input rotary body to a power output rotary body while dampening the vibration transmitted from the power input rotary body to the power output rotary body, comprising:

a power output member coupled to the power output rotary body;

an intermediate member disposed radially outward from said power output member;

a first elastic member for elastically coupling said power output member and said intermediate member allowing limited relative rotary displacement therebetween;

first and second plate members disposed on opposite axial sides of said power output member and said intermediate member, said first and second plate members being fixed to each other with said power output member and said intermediate member disposed therebetween, at least one of said first and second plate members being couplable to the power input rotary body;

a second elastic member for elastically coupling said intermediate member and said first and second plate members in the rotational direction thus allowing for limited relative rotary displacement between said intermediate member and said first and second plate members, said second elastic member having a rigidity different from the rigidity of said first elastic member;

a first friction member disposed between said power output member and said first plate member, said first friction member slidably movable against said power output member to produce hysteresis torque;

a second friction member disposed between said intermediate member and said first plate member, said second friction member slidably moving against said intermediate member to produce hysteresis torque, said second friction member having a friction coefficient different form the friction coefficient of said first friction member; and a third friction member disposed between said power output member, said intermediate member and said second plate member, said third friction member being fixed to said second plate member for rotation therewith, a first portion of said third friction member slidably engaged with said power output member, said first portion having a friction coefficient substantially the same as the friction coefficient of said first friction member, a second portion of said third friction member slidably engaged with said intermediate member and said second portion having a friction coefficient substantially the same as the friction coefficient of said second friction member.

2. The damper mechanism according to claim 1, wherein said third friction member is integrally formed of at least two different materials such that said first portion is made of a first of said two different materials and said second portion is made of a second of said two different materials.

3. The damper mechanism according to claim 1, further comprising:

- a first biasing member, for biasing said first friction member toward said power output member, disposed between said first plate member and said first friction member, and
- a second biasing member, for biasing said second friction member toward said intermediate member, disposed between said first plate member and said second friction member, wherein:
- the modulus of elasticity of said first elastic member is lower than the modulus of elasticity of said second elastic member;
- the friction coefficient of said first elastic member is lower than the friction coefficient of said second elastic member;
- said first friction member is non-rotatably engaged with said first plate member and slidably moves against said power output member to produce a first hysteresis torque;
- said second friction member is non-rotatably engaged with said first plate member and slidably moves against said intermediate member to produce a second hysteresis torque larger than said first hysteresis torque; and
- said first portion of said third friction member is non-rotatably engaged with said second plate member, slidably moves against said power output member to produce a small hysteresis torque substantially identical with said first hysteresis torque, and said second portion of said third friction member slidably moves against said intermediate member to produce a large hysteresis torque substantially identical with said second hysteresis torque.

* * * * *